United States Patent
Kangas et al.

(10) Patent No.: US 8,406,787 B2
(45) Date of Patent: Mar. 26, 2013

(54) POSITIONING IN TELECOMMUNICATION SYSTEMS

(75) Inventors: Ari Kangas, Lidiingö (SE); Bo Göransson, Sollentuna (SE); Karl Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 131 days.

(21) Appl. No.: 13/140,234

(22) PCT Filed: Mar. 30, 2009

(86) PCT No.: PCT/EP2009/053724
§ 371 (c)(1),
(2), (4) Date: Jun. 16, 2011

(87) PCT Pub. No.: WO2010/069610
PCT Pub. Date: Jun. 24, 2010

(65) Prior Publication Data
US 2012/0052875 A1    Mar. 1, 2012

Related U.S. Application Data

(60) Provisional application No. 61/138,226, filed on Dec. 17, 2008.

(51) Int. Cl.
*H04W 24/00* (2009.01)

(52) U.S. Cl. .................. 455/456.1; 455/456.5

(58) Field of Classification Search .... 455/456.1–456.6, 455/418–420
See application file for complete search history.

(56) References Cited

U.S. PATENT DOCUMENTS

| | | | |
|---|---|---|---|
| 2004/0067759 A1* | 4/2004 | Spirito et al. | 455/456.1 |
| 2008/0020785 A1* | 1/2008 | Liu et al. | 455/456.2 |
| 2009/0060033 A1* | 3/2009 | Kimmich et al. | 375/240.02 |
| 2010/0074364 A1* | 3/2010 | Kwon et al. | 375/285 |

* cited by examiner

*Primary Examiner* — Brandon Miller
(74) *Attorney, Agent, or Firm* — Coats & Bennett, P.L.L.C.

(57) ABSTRACT

A method for providing a position determination comprises obtaining (210) of data representing signal properties of a cellular communication network associated with a user equipment and determining of a position for the user equipment based on the signal properties. The method further comprises obtaining (212) of data representing a precoder selection for spatial multiplexing for the user equipment. The determining (214) of a position for the user equipment is based also on the data representing the precoder selection. An arrangement for providing a position determination is also disclosed.

16 Claims, 11 Drawing Sheets

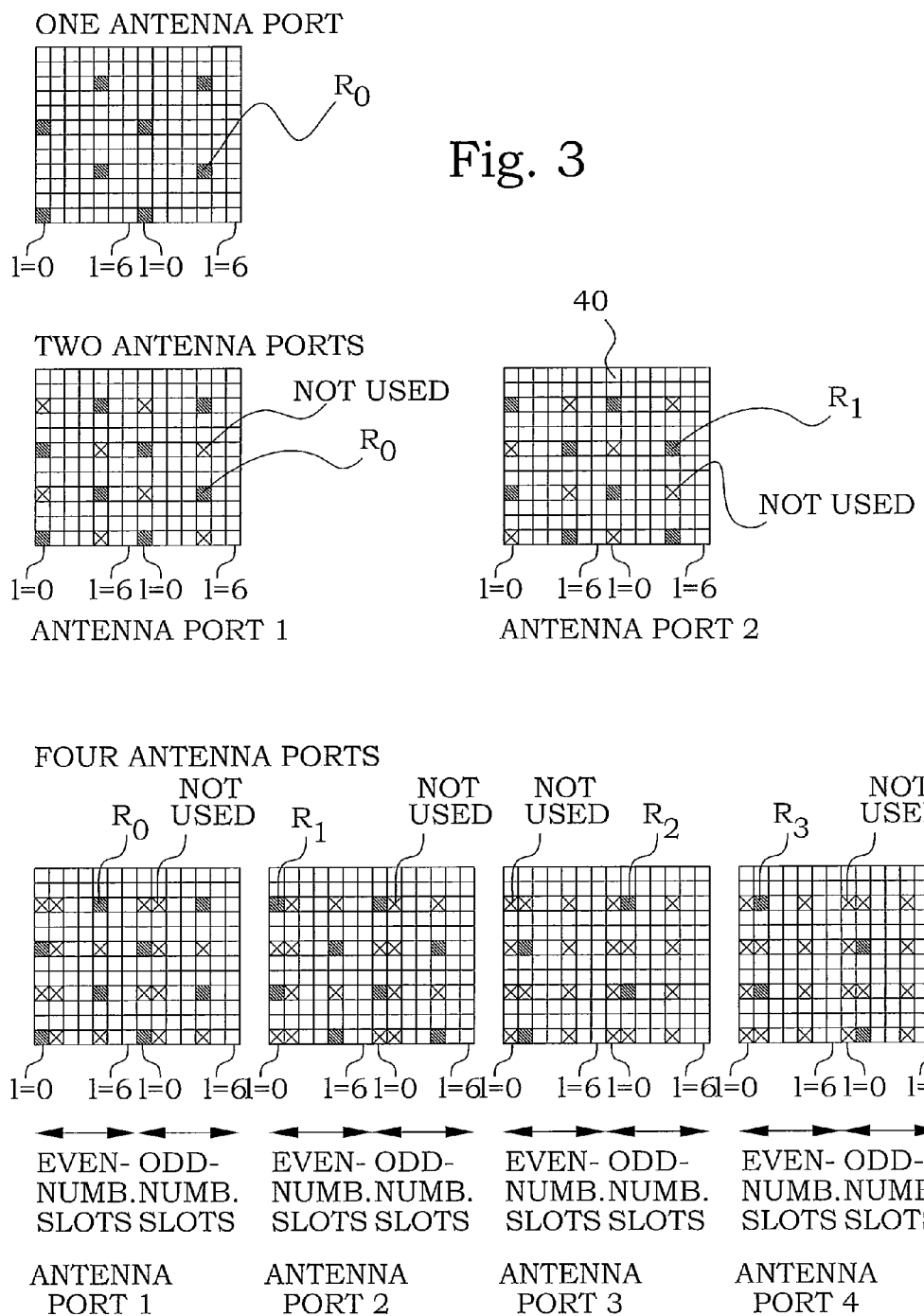

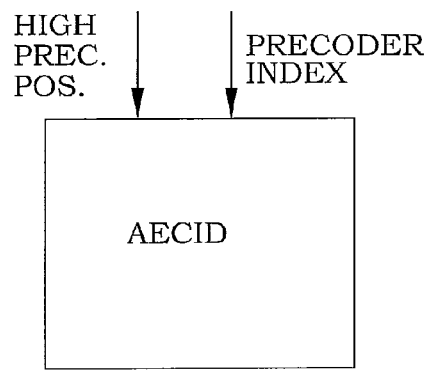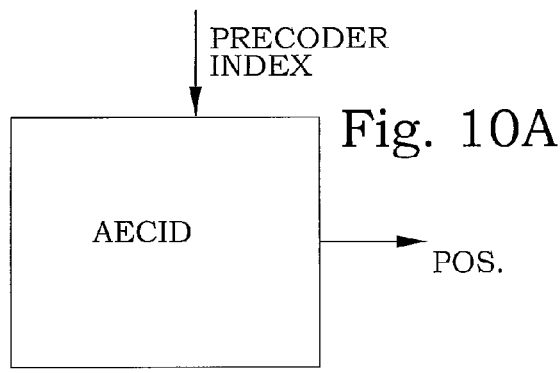
Fig. 10A
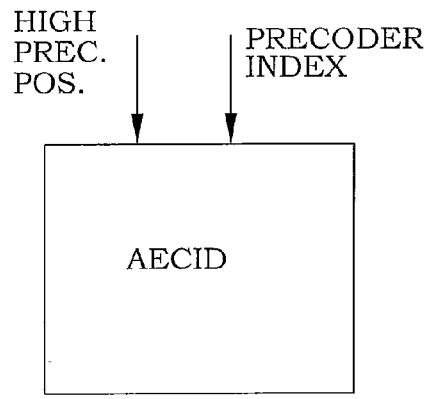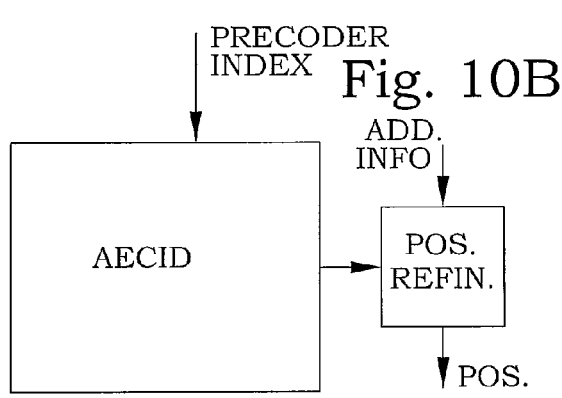
Fig. 10B
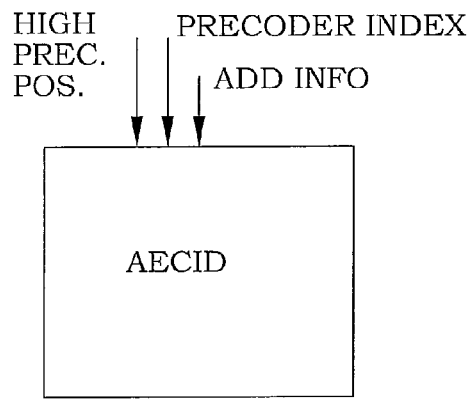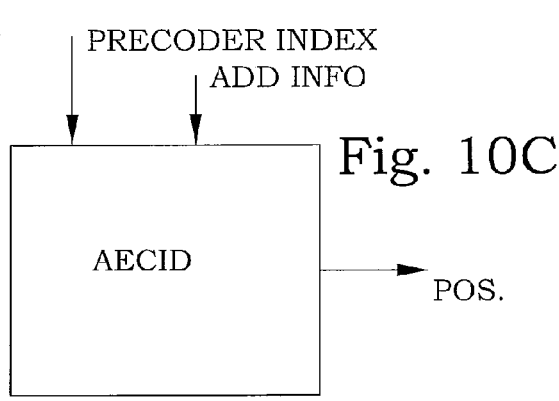
Fig. 10C
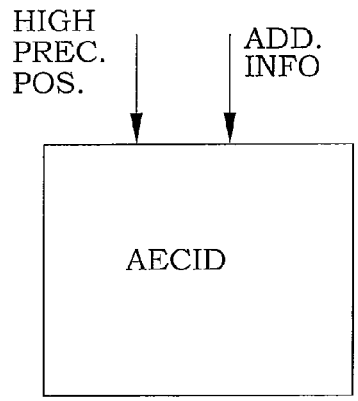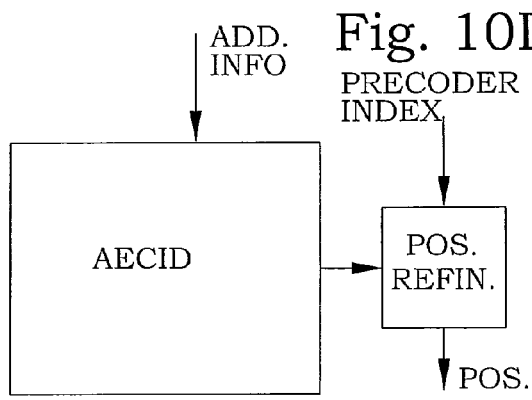
Fig. 10D

POSITIONING IN TELECOMMUNICATION SYSTEMS

TECHNICAL FIELD

The present invention relates in general to position dependency in cellular communications networks and in particular to positioning or location based services in different network architectures.

BACKGROUND

The possibility to determine the position of a mobile device has enabled application developers and wireless network operators to provide location based, and location aware, services. Examples of those are guiding systems, shopping assistance, friend finder, presence services, community and communication services and other information services giving the mobile user information about their surroundings.

In addition to the commercial services, the governments in several countries have put requirements on the network operators to be able to determine the position of an emergency call. For instance, the governmental requirements in the USA (FCC E911) state that it must be possible to determine the position of a certain percentage of all emergency calls. The requirements make no difference between indoor and outdoor environment.

In outdoor environments, the position estimation can be done using e.g. the global positioning system, i.e. GPS (Global Positioning System), or methods based thereon, such as Assisted-GPS (A-GPS). However, this requires that the user equipment has to be provided with additional functionalities concerning e.g. reception of radio signals.

Position estimation can also be performed using the wireless network itself. Methods using the wireless network can be grouped in different groups. A first group comprises methods that are based on the identification of the radio cell to which a mobile terminal is attached, e.g. by using Cell-ID. In its simplest form, a user equipment UE is known to be situated within the coverage area of a certain base station if the user equipment is communicating with the wireless network through that base station. This can be improved by also taking information from so-called neighbor lists into account. However, the accuracy is even then not very impressive.

Another group of position estimation methods are based on measurements of signal propagation times or quantities related thereto. Timing Advance (TA) in LTE systems and Round Trip Time (RTT) in WCDMA systems are examples of such methods. Briefly, the travel time of radio waves from the Radio Base Station (RBS) to the UE and back is measured. The round trip time measurement alone defines a circle, or if the inaccuracy is accounted for, a circular strip around the RBS, within which the UE. By combining such information with propagation times to neighboring RBS's enabling triangulation calculations, the accuracy can be improved somewhat. However, this possibility does only occur in a limited part of the cells, typically less than 25%. The signal propagation time measurements can also be combined with Cell-ID information, which typically restricts the area in which the UE can be situated to the sector of the circular strip being situated within the cell. As for other terrestrial positioning methods, like observed time difference of arrival (OTDOA), these suffer from a too low detection performance to provide good enough performance, at least in the basic configuration.

A more promising approach is provided by so called fingerprinting positioning, see e.g. "Adaptive enhanced cell-ID fingerprinting localization by clustering of precise position measurement", in IEEE Trans. Vehicular Tech., vol. 56, no. 5, 2007, pp. 3199-3209 by T. Wigren. Fingerprinting positioning algorithms operate by creating a radio fingerprint for each point of a fine coordinate grid that covers the Radio Access Network (RAN). The fingerprint may e.g. consist of detectable cell ID's, quantized path loss or signal strength measurements, quantized RTT or TA, quantized noise rise, radio connection information like the radio access bearer (RAB) and/or quantized time. When a positioning is to be performed, a fingerprint is detected and compared with stored relations between fingerprints and position. In such a way, an area within which the UE with a certain certainty is situated can be achieved. However, also the fingerprinting technology is sometimes too inaccurate, this being due to the limited availability of good enough measurements for creating characteristic fingerprints.

There is hence a need for methods and apparatuses further improving the positioning accuracies.

SUMMARY

An object of the present invention is to provide methods and arrangements that enable a more accurate positioning of user equipment.

The above object is achieved by methods and arrangements according to the enclosed patent claims. In general words, according to a first aspect, a method for providing a position determination comprises obtaining of data representing signal properties of a cellular communication network associated with a user equipment and determining of a position for the user equipment based on the signal properties. The method further comprises obtaining of data representing a precoder selection for spatial multiplexing for the user equipment. The determining of a position for the user equipment is based also on the data representing the precoder selection.

According to a second aspect, an arrangement for providing a position determination comprises means for obtaining data representing signal properties of a cellular communication network associated with a user equipment and means for obtaining data representing a precoder selection for spatial multiplexing for the user equipment. The arrangement further comprises a position determining unit, connected to the means for obtaining data representing signal properties and the means for obtaining data representing a precoder selection. The position determining unit is arranged for determining of a position for the user equipment based on the signal properties and arranged for partly basing the determining of a position on the precoder selection.

An advantage with the present invention is that additional information available in e.g. MIMO-based systems is found to enable accuracy improvements if combined with a plurality of already existing positioning methods.

BRIEF DESCRIPTION OF THE DRAWINGS

The invention, together with further objects and advantages thereof, may best be understood by making reference to the following description taken together with the accompanying drawings, in which:

FIG. 3 are examples of mapping of reference signals to resource elements for multiple antennas;

FIGS. 10A-D are schematic illustrations of different approaches for using precoder selection data for enhancing AECID positioning;

DETAILED DESCRIPTION

Throughout the drawings, the same reference numbers are used for similar or corresponding elements.

Existing positioning solutions are such that they do not provide an accurate enough position for many commercial and regulated services, e.g. emergency call positioning. Technologies that do provide a good accuracy, such as GPS based methods, instead suffers from not working at all locations where the reception of the satellite signals are bad, such as indoors, in tunnels or in dense urban location with many high rise buildings.

When analysing the nature of the lack of accuracy of most prior art positioning method based on signal properties of the wireless network, it was discovered that the accuracy often is relative good in the direction pointing towards the base station, while the accuracy in the lateral domain, i.e. in a direction normal to the direction pointing towards the base station, typically is poor. Additional information enabling distinguishing in the lateral domain would therefore be of benefit. Such information would then be possible to combine with or enhance position determinations provided with a variety of prior art approaches.

One or more embodiments herein complement positioning based on signal properties achieved within the wireless communication network, with implicit angle information available though a pre coder selection used for spatial multiplexing. The embodiments improves and/or augments several positioning methods, both in WCDMA and LTE, e.g. based on the Timing Advance or RTT measurement or based on AECID approaches. The precoder selection is found to present an implicit angle measurement, which complements very well with other types of available data.

One or more embodiments herein select a precoding scheme in the RBS, based on measurements in the UE. This is done to maximize the throughput, i.e. the SNR. Since the pre-coding scheme is direction depending, this hence results in a measurement or selection, which is related to the direction between the terminal and the base station. Note that normally Direction of Arrival Estimation is made by the Base Station.

Figure 1:
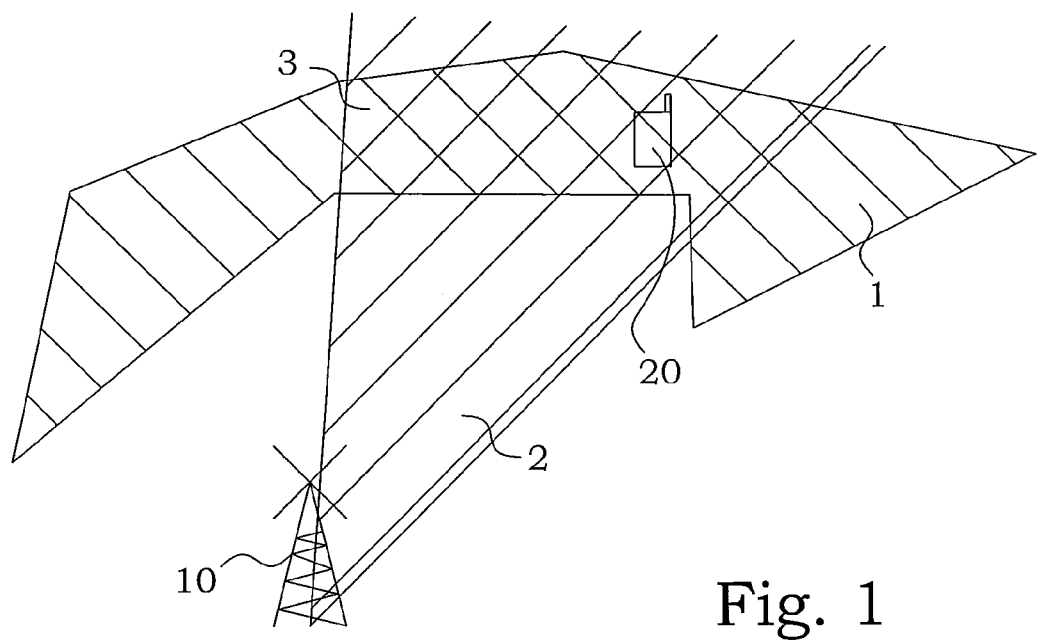
FIG. 1 is an illustration of possible enhancements of position determinations according to the present invention.

One approach of these ideas is illustrated in FIG. 1. A RBS 10 communicates with a UE 20. By a known position determination method, it has been concluded that the UE 20 is situated within a limited area 1 of the coverage area of the RBS 10. In the communication between the RBS 10 and the UE 20, a certain pre-coding scheme used for spatial multiplexing is selected. The angle distribution of the signals transmitted by such a coding scheme is limited (with a certain probability) to a sector area 2. It can thus also be concluded that the UE 20 is situated within that sector are 2. By combining these two pieces of information, the area within which the UE 20 is likely to be situated can be reduced to the overlapping area 3 of the area 1 and the sector area 2.

In another approach, the direction information associated with the selected pre-coding scheme can be utilized as parameters in the positioning methods themselves.

The present invention improves the positioning accuracy, and defines new positioning methods, in particular for LTE and WCDMA, by providing position measurement information in the lateral direction, i.e. being orthogonal to the presently available round trip time and TA measurements.

The present invention exploits existing MIMO antenna configurations and effects, to obtain the requested information related to the direction to the terminal, as seen from the serving base station. This reduces the need e.g. for combination of signal strength measurements from multiple RBSs.

In different embodiments the invention results in a new positioning method, combining RTT and precoding directions in MIMO WCDMA systems, a new positioning method, combining TA and precoding directions in MIMO LTE systems, or extended fingerprinting positioning, in particular Ericsson's AECID method, buy addition of precoding directions as a radio fingerprint or tag. This last embodiment is applicable for MIMO configuration of both WCDMA and LTE. Such embodiments are described more in detail further below.

However, in order to understand the direction information available through the precoding scheme selection, some particular aspects of MIMO configurations are first described somewhat more in detail. Several new cellular standards, like LTE and WiMAX, make use of so called Multiple-Input Multiple-Output (MIMO) transmission. Basically, this means that additional data streams are introduced by the use of multiple transmission and/or receiver antennas. This is a generally available technology and it is therefore not described in detail here. The general idea behind MIMO is however, to introduce a spatial dimension into the radio resource space and thereby increasing the maximum possible utilization of the radio resource space, i.e. to increase the spectral efficiency. However, some aspects are described, which are necessary to understand the necessary details for the precoding based positioning ideas.

Figure 2:
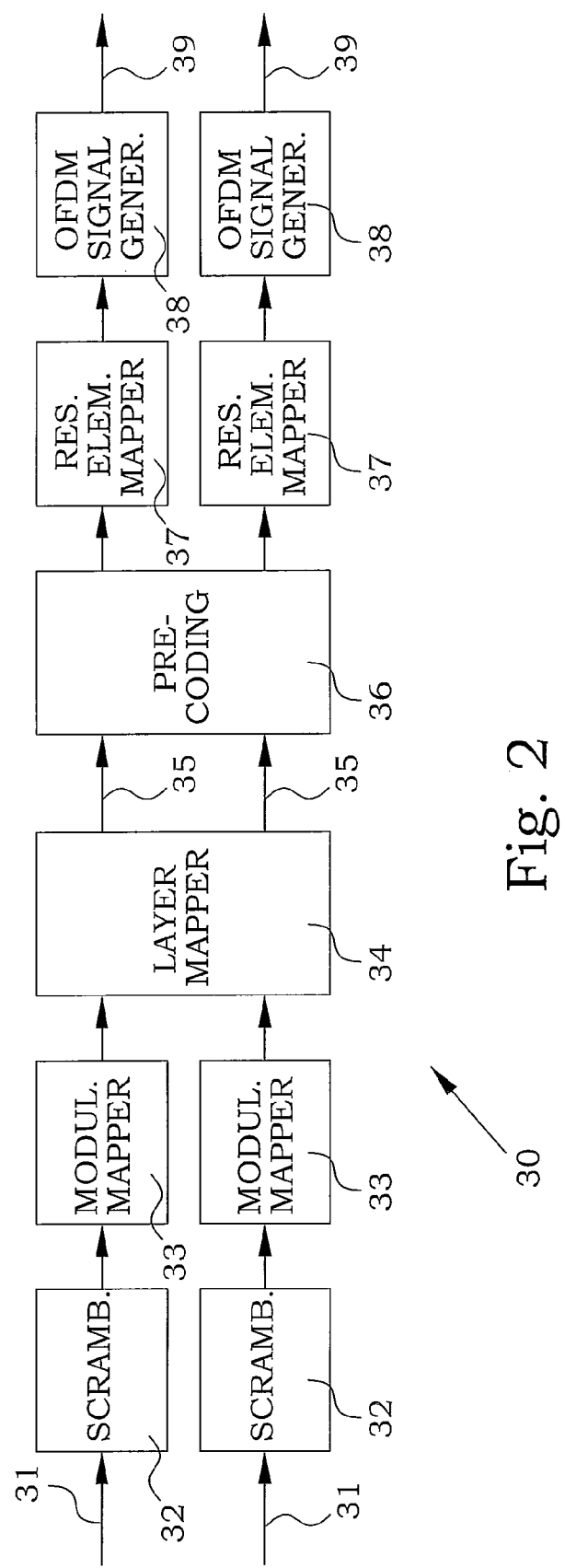
FIG. 2 is a schematic illustration of physical channel processing.

MIMO schemes assume that the transmitter and receiver are both equipped with multiple antennas, and that multiple modulated and precoded signals are transmitted on the same time-frequency resource element. FIG. 2 illustrates physical channel processing in such a MIMO system 30. Coded information bits 31 arrive at the scrambler unit 32 where the bits are scrambled. Maximum two parallel streams of coded bits are allowed in LTE Release 8. In the modulation mapper module 33 the coded bits are grouped and mapped to a modulation alphabet, such as QPSK, 16QAM or 64QAM. In the layer mapping module 34, the modulated bits are further mapped into nLayer different vectors, called layers 35. nLayer is typically less than or equal to the number of TX (nTX) antennas. For each element in the layer vectors, the layer mapped symbols are multiplied with a precoding matrix 36, which has dimensions (nTX, nLayer). The precoding process produces nTX complex-valued vectors. In the resource element mapper 37, the precoded signals are mapping onto resource elements in the OFDM time/frequency grid. In the OFDM signal generator 38, the signal is transformed from the frequency to a signal 39 in the time domain for each OFDM symbol (typically by using an IFFT). A cyclic prefix is added to each OFDM symbol.

In FIG. 3, examples of mapping of reference signals to resources elements 40 for multiple antennas are illustrated. Resource elements used for transmission of reference symbols $R_0$-$R_3$ on one antenna port is typically not used for the other antenna ports. Reference signals are used by the UE for channel estimation, which is needed for demodulaton and for estimating the quality of the radio link.

Mathematically, the transmitted signal for a particular frequency/time resource element (k,l) can be expressed as:

$$x(k,l) = W_{RI,PMI}(k,l) \cdot s(k,l) \qquad (1)$$

where k is the subcarrier (frequency) index and l is the time index of the resource element. Here s is a vector with elements $s_i$, i=1, ..., RI, and where $s_i$ is a modulated symbol. RI is the rank indicator, i.e. the number of signals (layers) transmitted on the same time-frequency resource element. $W_{RI,PMI}(k,l)$ is the so-called precoding matrix of dimension $N_{tx}$ x RI. x is a vector of transmitted signals, where x(i), i=1, ..., $N_{tx}$, is the signal transmitted from the ith transmit antenna. The indices RI and PMI attached to the precoder indicate that the precoder is selected from a finite set of precoders as will be explained later. The signal is transmitted over a channel with channel matrix H which is of dimension $N_{rx}$ x $N_{tx}$. The received signal vector is then an $N_{rx}$ dimensional vector given by:

$$y = Hx = HW_{RI,PMI}s + e \qquad (2)$$

where e is the noise and interference vector, with covariance matrix $R_e$. Note that in (2) the indices (k,l) have been omitted to simplify notation.

The UE can estimate the channel matrix H based on reference symbols transmitted from all transmit antennas. The reference symbols are typically transmitted on orthogonal resources, i.e. a resource element used for transmitting reference symbols from one antenna is not used by any other antenna, as mentioned above in connection with FIG. 3.

The used precoder matrix is signaled to the UE so that it can form the composite channel HW and demodulate the signal s. The precoder matrix W is selected from a codebook with a finite set of elements.

For 2 TX antennas the codebook in Table 1 is used.

The choice of precoder matrix includes both rank selection, i.e. number of layers, and codebook index selection. For rank 1, the codebook contains 4 alternative precoders. For rank 2, the codebook contains 3 alternatives.

Assume now that the precoder selection is restricted to rank 1 elements. Then an estimate of the symbol s can be computed by combining the received signal in the following way (so-called IRC or MMSE weighting):

$$\hat{s} = (HW_{RI,PMI})^H R_e^{-1} y = (HW_{RI,PMI})^H R_e^{-1} (HW_{RI,PMI})s + (HW_{RI,PMI})^H R_e^{-1} e \qquad (3)$$

TABLE 1

Codebook for 2 TX antennas.

| Precoder matrix index (PMI) | Transmission rank indicator (RI) | |
| --- | --- | --- |
|  | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |

TABLE 1-continued

Codebook for 2 TX antennas.

| Precoder matrix index (PMI) | Transmission rank indicator (RI) | |
| --- | --- | --- |
|  | 1 | 2 |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

The SNR after signal combining can be written:

$$SNR = (HW_{RI,PMI})^H R_e^{-1} (HW_{RI,PMI}) \qquad (4)$$

To maximize the throughput, it is desired to choose the RI and PMI so that SNR is maximized. This requires knowledge of the channel matrix H and the covariance $R_e$, knowledge which is only present in the UE. Therefore the standards contain mechanisms so that UE can report the preferred RI and PMI to the base station.

Next it will be shown how precoder selection relates to the location of the UE.

Figure 4:
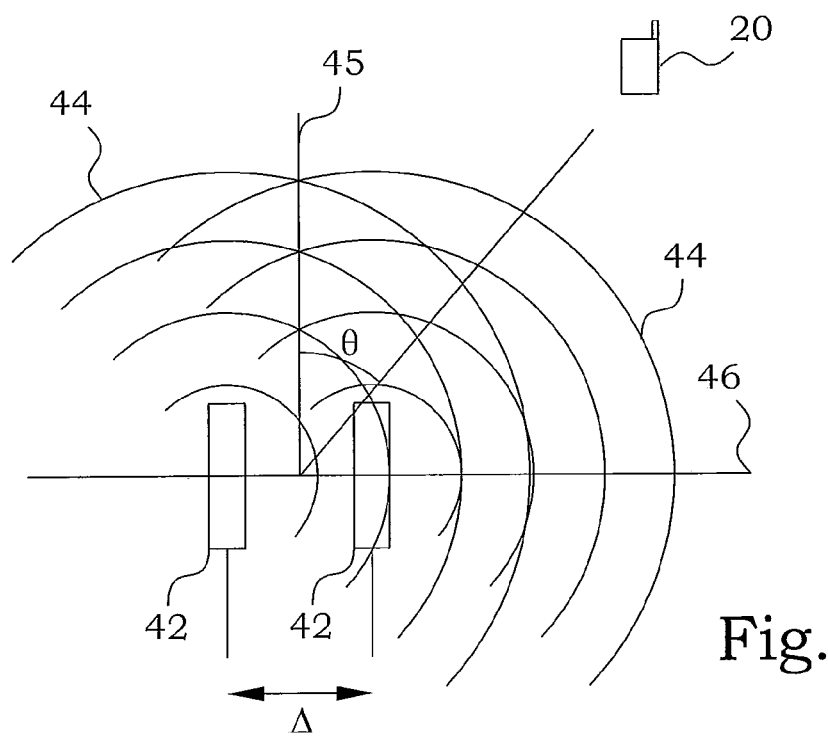
FIG. 4 is an illustration of an antenna port geometry.

Assume the geometry in FIG. 4. Two antenna ports 42 are spaced apart by a distance Δ and give rise to respective signals 44 propagating to a UE 20, situated at an angle θ with respect to the normal 45 to the connection lin e46 between the antenna ports 42. Rank 1 transmission is assumed so that the precoder W is a column vector with kth element equal to $w_k$. The signal $s_k(t) = w_k \cdot s \cdot \exp(i\omega_c t)$ is transmitted from the kth antenna. The received noise-free signal is:

$$r_k(t) = h \cdot w_k \cdot s \cdot \exp(i\omega_c(t-\tau_k)), \qquad (5)$$

where h is the attenuation of the signal, $\tau_k$ is the delay from base station antenna k to the UE. This is:

$$\tau_k = d_k/c. \qquad (6)$$

Assuming that the UE is far from base station relative to the distance between the antennas, the relative delay can be written:

$$\tau_k - \tau_j = \Delta_{k,j} \sin(\theta)/c \qquad (7)$$

Assuming arbitrarily that the sensor 1 is the reference, then:

$$r_k(t) = h \cdot w_k \cdot s \cdot \exp(-i\omega_c\tau_1) \cdot \exp(i\omega_c(t-(\tau_k-\tau_1))) = h \cdot w_k \cdot s \cdot \exp(-i\omega_c\tau_1)\exp(i\omega_c t)\cdot \exp(i\omega_c\Delta_{k,1}\sin(\theta)/c) = h_c \cdot w_k \cdot \exp(i\omega_c t) \cdot \exp(-2\pi\Delta_{k,l}\sin(\theta)/\lambda) \cdot s \qquad (8)$$

Here λ is the wavelength and the notation:

$$h_c = h \cdot \exp(-i\omega_c\tau_1) \qquad (9)$$

has been used. The resulting SNR assuming for simplicity that Re=I, h=1 is:

$$SNR = (w_1 + \ldots + w_N \exp(i2\pi\tilde{\Delta}_{N,1}\sin(\theta))^H(w_1 + \ldots + w_N \exp(i2\pi\tilde{\Delta}_{N,1}\sin(\theta)) \qquad (10)$$

Figure 5A:
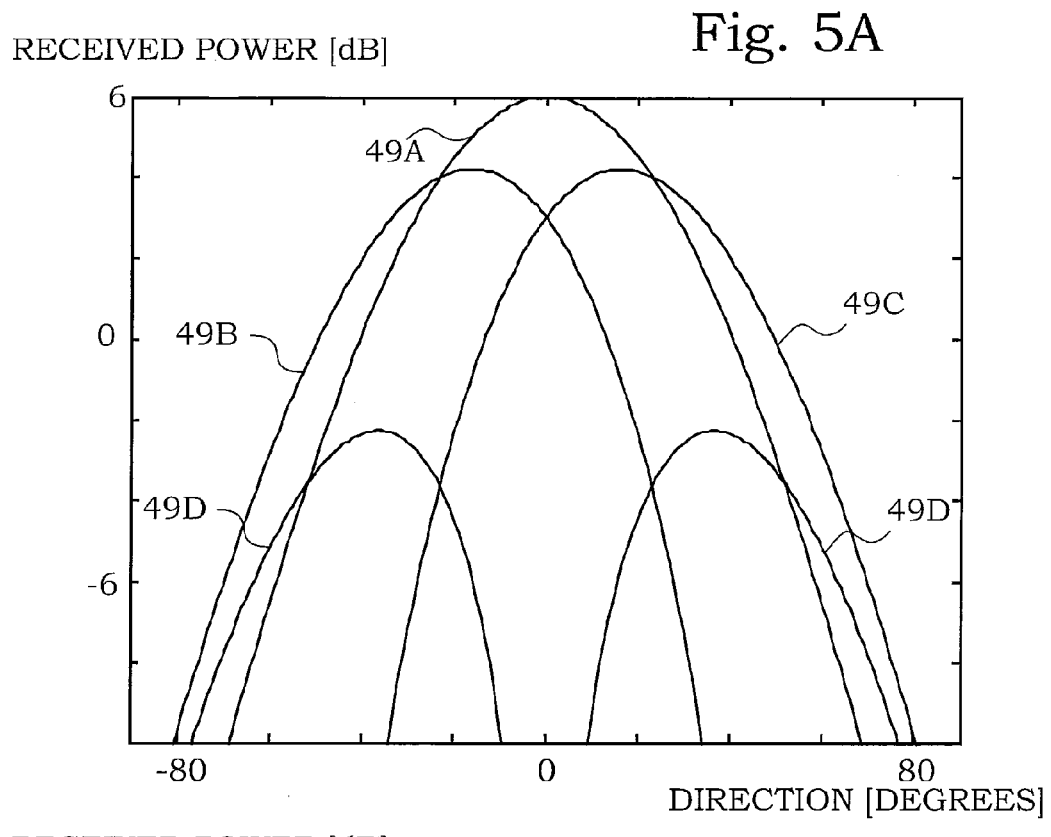
FIGS. 5A-B are diagrams of SNR for different precoders as a function of the angle of arrival.
Figure 5B:
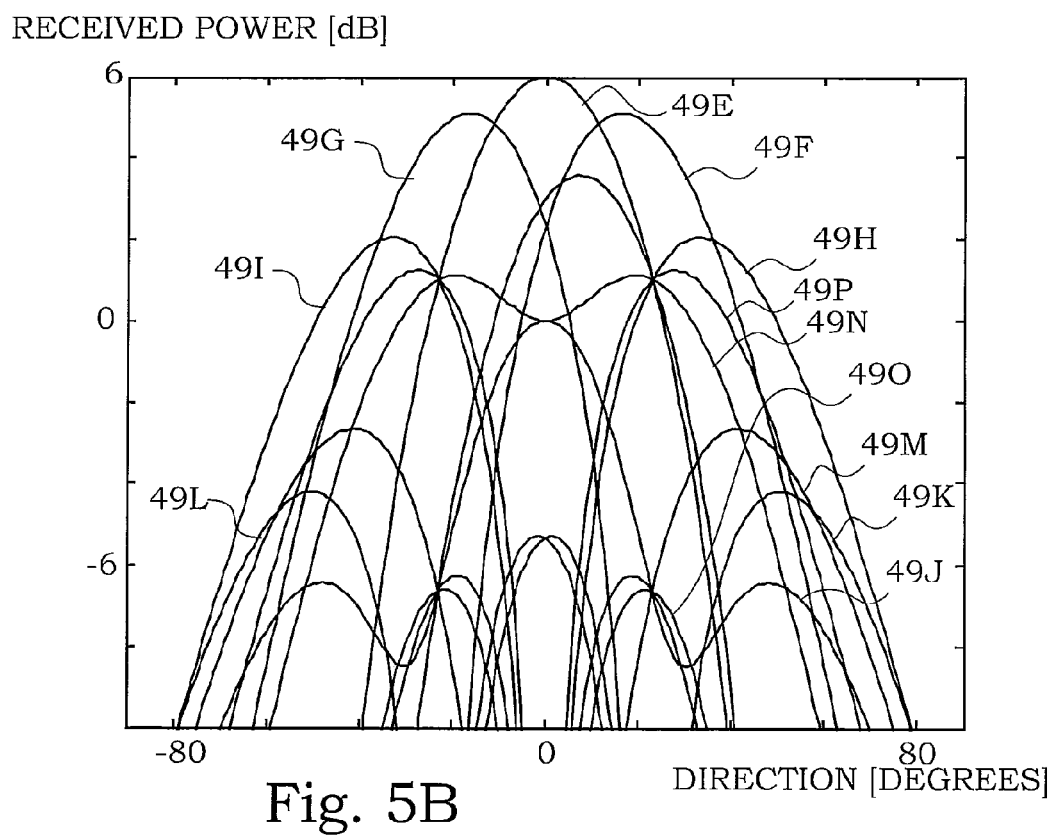

The SNR 49A-P for different precoders as a function of the angle of arrival θ is plotted in FIG. 5A for 2 TX antennas and in FIG. 5B for 4TX antennas with $\tilde{\Delta}_{k,1} = 2*(k-1)$. Clearly there is a strong relation between azimuth and the index of the precoder maximizing SNR. Note that not all precoders may be useful. For the 4TX case, only SNR 49E-1 of 5 candidate precoders are needed. The candidates have to be strong enough and have lobes with maximum SNR in different directions.

For two TX antennas it can be seen that 3 different precoders provide maximum SNR 49A-C in different azimuth angles. Therefore a measurement that indicates any of these precoders can be viewed as a direction angle measurement. The SNR 49D of the fourth precoder, having two angle intervals with high received power separated by an angle interval with low received power, seems to be useless in this application. Therefore it may be wise to restrict the measurement to only the three other candidates.

Another possibility is to make several measurements, in which the strongest precoder from the first measurement is excluded. Thereby it may be possible to reduce the angular extension further. E.g. if the first measurement indicates that we are in the main lobe around θ=0 degrees, a second measurement excluding that precoder may provide us with information about if we are at negative or positive angles relative to θ=0. Thereby the angular extension can be reduced by 50%.

The basic advantage of the invention is that it introduces new position related information. The angle distributions of the SNR of the different decoders give an indication within what angle region the corresponding UE is present. Also some information about the probability distribution is available.

This information can be used for positioning purposes as such, however, it is even more useful when being combined with other positioning approaches. For instance, the new position related information that is made available is orthogonal to the presently available round trip time and TA based measurements of a "distance from the base station". It is also useful in connection with fingerprinting methods.

Figure 6:
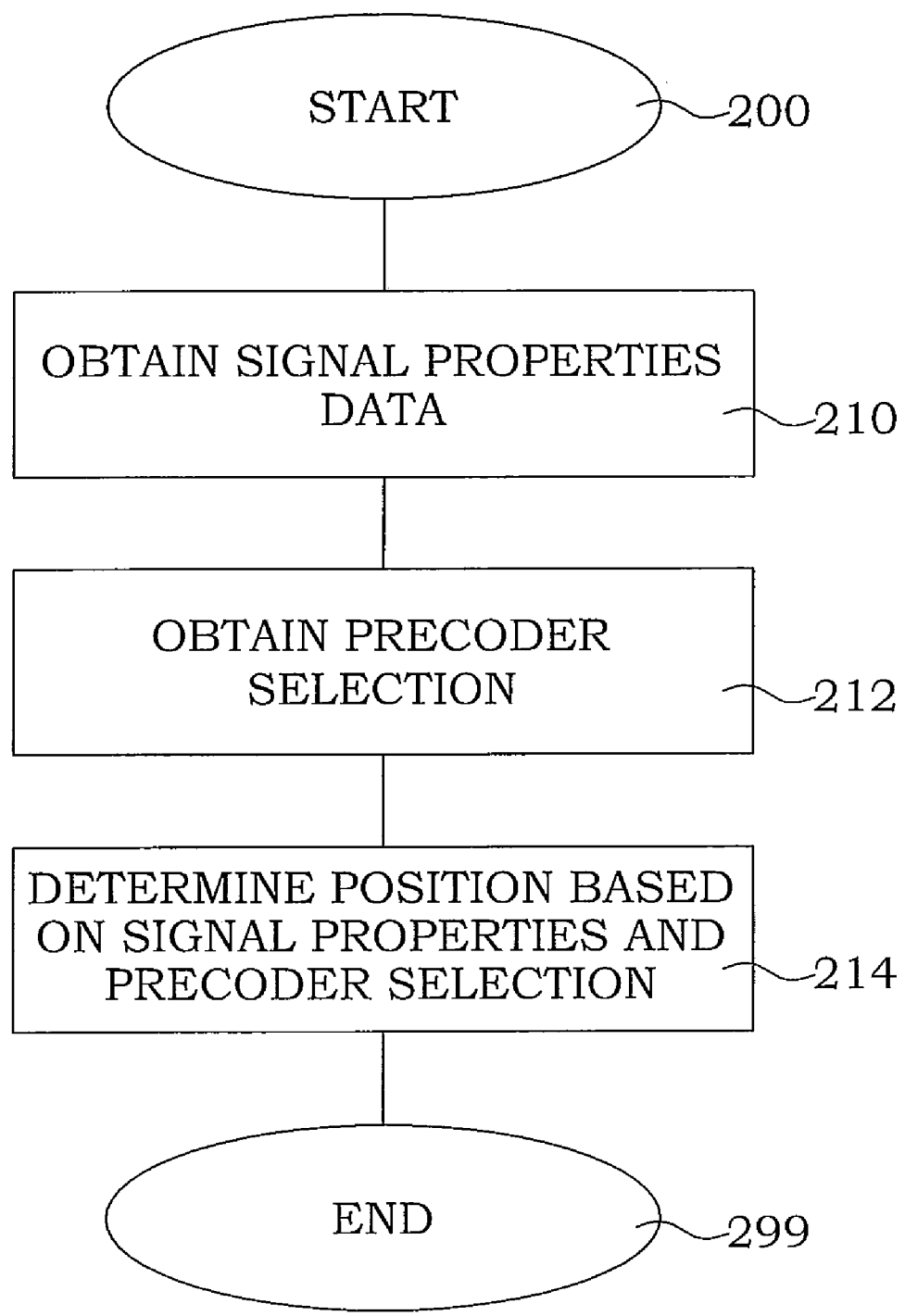
FIG. 6 is a flow diagram of steps of an embodiment of a method according to the present invention.

FIG. 6 illustrates steps of an embodiment of a method according to the present invention. The method for providing a position determination starts in step 200. In step 210 data representing signal properties of a cellular communication network associated with a user equipment is obtained. Examples of such signal properties are fingerprinting parameters or signal propagation times within the cellular communication network. In step 212, data representing a precoder selection for spatial multiplexing for the user equipment is obtained. A position for the user equipment is determined in step 214 based on the signal properties as well as on the data representing the precoder selection. The procedure is ended in step 299.

A few exemplifying embodiments are given here below, targeting RTT or TA based positioning and fingerprinting positioning methods as the base positioning method. A short summary of methods based on RTT or TA measurements is first given.

Figure 7A:
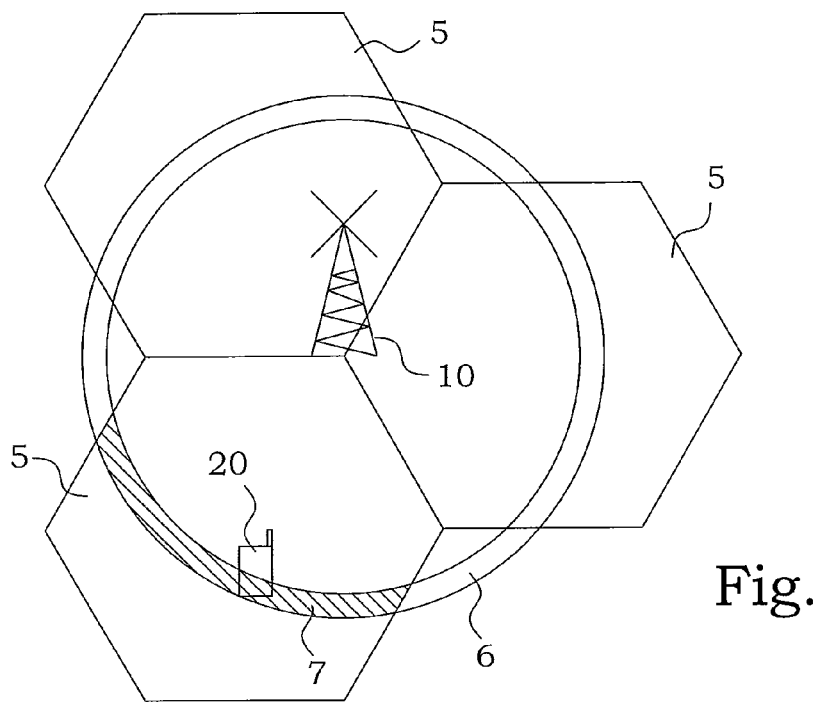
FIG. 7A is a schematic illustration of prior art RTT positioning.

A Timing Advance (TA) in LTE or a Round Trip Time (RTT) in WCDMA is an example of a positioning method using the propagation time of a radio signal within the wireless network. Taking the round trip time (RTT) measurement principle as an example, it is schematically depicted in FIG. 7A. The distance from the RBS 10 to the UE 20 then follows from the formula:

$$r = c\frac{RTT}{2}, \quad (11)$$

where RTT is the round trip time and where c is the speed of light. This defines a circular strip 6. By combining this information with the cell polygon 5, left and right limiting angles of the circular strip 6 can be computed, within which sector arc 7 the UE 20 is situated.

In several systems, among these the Wideband Code Division Multiple Access (WCDMA) system, Round Trip Time (RTT) can therefore be used to identify the distance from the antenna at which a UE is positioned. This provides only a distance and is not possible to ascertain where in the sphere or sector around the antenna the UE is. If for example the RTT measurements determine that the UE is 500 m from the base station, this positioning is along an arc in a sector 7 or the circumference of a circle.

Triangulation measurements of RTT from several base stations can be used to increase accuracy. However, this possibility is limited by the fact that the terminal needs to be in handover with more than one base station for this to be possible, i.e. in soft(er) handover. This does only occur in a limited part of the cells, typically less than 25%. Hence multi-leg RTT in WCDMA will not have a good availability.

The RTT method outline above is accurate in the radial direction but the angular accuracy depends on the distance from the base station. The method cannot successfully extended to usage of intersections of arcs from different base stations, due to the need to be in soft(er) handover. This severely limits the availability of such positioning methods used as such.

Figure 7B:
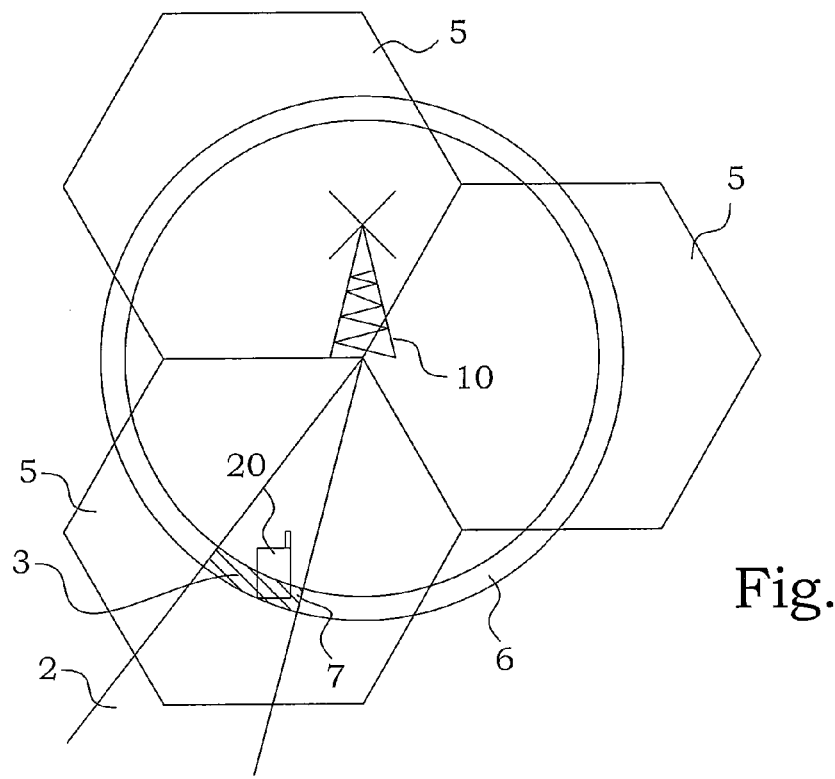
FIG. 7B is a schematic illustration of an enhanced RTT positioning according to the present invention.

At the contrary, according to an embodiment of the present invention, the effect of a combination of precoder based position information and the distance information of RTT is a significantly enhanced positioning accuracy. The distance information of RTT defines a circular arc 6, possibly with uncertainties, on which the true position is present. The precoder information, defining a sector area 2, then assists in reducing the angles of the arc 7 between which the UE is situated as the overlapping area 3 as illustrated in FIG. 7B. This advantage is thus obtained in particular for cellular systems exploiting MIMO technology, e.g. in WCDMA and LTE.

Figure 8:
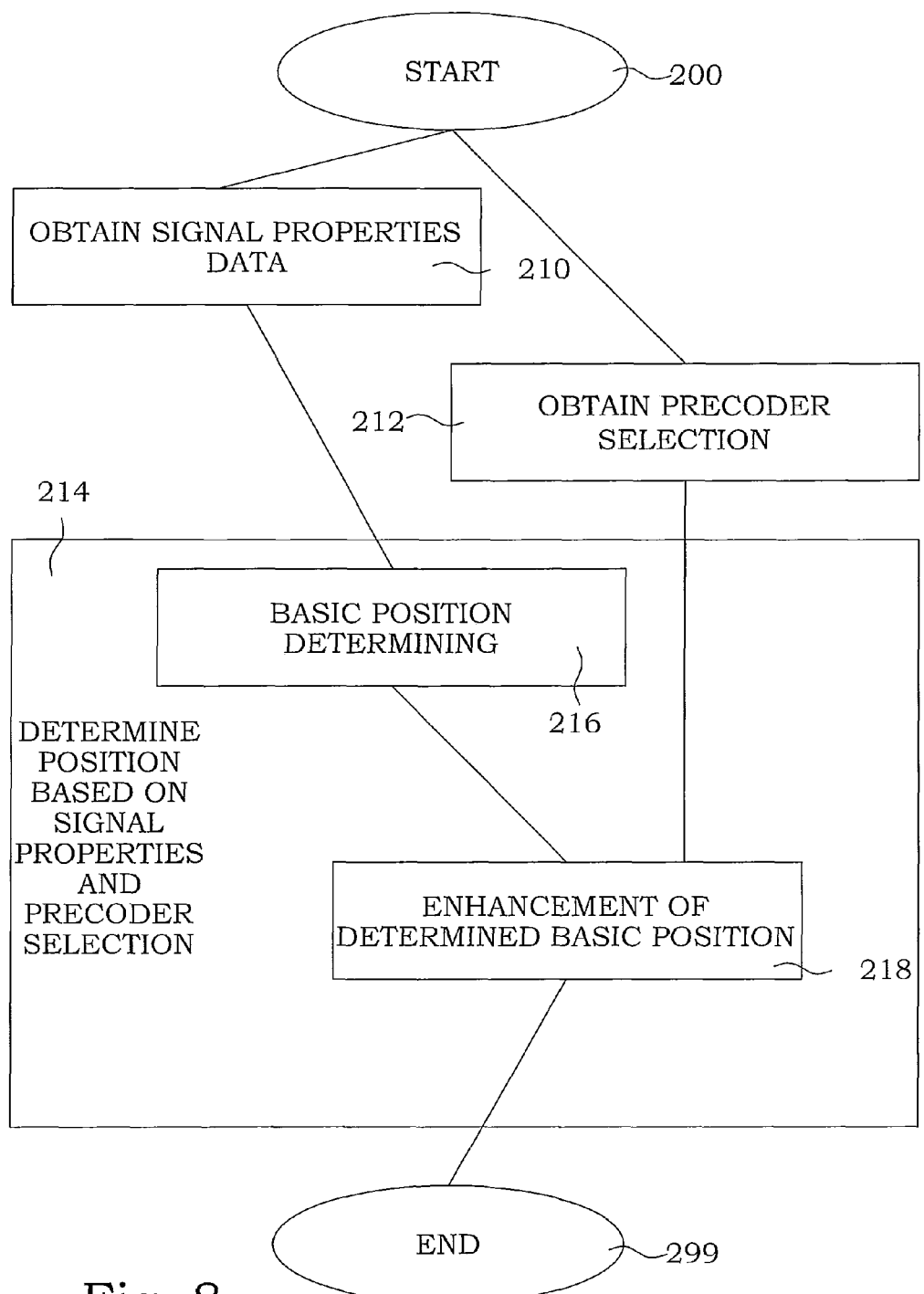
FIG. 8 is a flow diagram of steps of another embodiment of a method according to the present invention.

FIG. 8 illustrates steps of an embodiment of a method according to the present invention using timing advance measurements or round trip time measurements. Step that are identical with the steps of FIG. 6 are not further discussed. Step 214 comprises in this embodiment a first part step 216, where a basic position determining is performed based on the signal properties. In this particular embodiment, the basic positioning determining is based on timing advance measurements or round trip time measurements. Typically, a circumference of a circle is defined, possibly limited by the border of the cell to which the user equipment is connected. Step 214 further comprises the part step 218 in which an enhancement of the basic position determination is performed by use of the precoder selection data. In this particular embodiment, this comprises the reduction of the circumference of the circle obtained in step 216 by the angular intervals defined by the precoder selection data.

An advantage with the present embodiment of the invention is that additional information is provided in the lateral domain. This is achieved without a need to combine poor signal strength measurements from multiple measurements. The present embodiment can thus be used to refine the accuracy of single-leg RTT positioning or single-leg TA positioning.

As for other terrestrial positioning methods, like observed time difference of arrival (OTDOA), these generally suffer from a too low detection performance to provide good enough performance, at least in a basic configuration.

The precoder based information can also be utilized in connection with fingerprinting positioning methods. A short overview of selected aspects of such methods is given here below.

Fingerprinting positioning algorithms operate by creating a radio fingerprint for each point of a fine coordinate grid that covers the Radio Access Network (RAN). The fingerprint may e.g. comprise of the cell IDs that are detected by the terminal, in each grid point. It may also comprise quantized path loss or signal strength measurements, with respect to multiple RBS's, performed by the terminal, in each grid point. Note that an associated ID of the RBS may advantageously also be needed. A quantized Round Trip Time in each grid point can also be a part of a fingerprint. Note that also here an associated ID of the RBS is of benefit. A further parameter possible to use in a fingerprint is quantized noise rise, in each grid point. This quantity represents the load of a CDMA system. Furthermore, radio connection information like the radio access bearer (RAB) or the quantized time can also be used in the fingerprint.

A fingerprinting method also needs reference positions. The database of fingerprinted positions can be generated in several ways. A first alternative would be to perform an extensive surveying operation that performs fingerprinting radio measurements repeatedly for all coordinate grid points of the RAN. One disadvantage of this approach is that the required surveying becomes substantial also for small cellular networks. Another disadvantage is that the radio fingerprints are in some instants sensitive to the orientation of the terminal, e.g. for signal strength and pathloss parameters. This is a fact that is particularly troublesome for handheld terminals. For fine grids, the accuracies of the fingerprinted positions therefore become highly uncertain. This is unfortunately seldom reflected in the accuracy of the reported geographical result.

Another approach, applied e.g. in Adaptive Enhanced Cell IDentity positioning (AECID), see e.g. "Adaptive enhanced cell-ID fingerprinting localization by clustering of precise position measurement", in IEEE Trans. Vehicular Tech., vol. 56, no. 5, 2007, pp. 3199-3209 by T. Wigren, is to replace the fine grid by high precision position measurements of opportunity, and to provide fingerprinting radio measurements for those points. This avoids the above drawbacks, however, algorithms for clustering of high precision position measurements of opportunity needs to be defined. Furthermore, algorithms for computation of geographical descriptions of the clusters also need to be defined.

The above two fingerprinting problems are solved by previous patent applications on the AECID positioning method, see e.g. the published international patent applications WO 2007/043915 and WO 2007/086784. AECID is a positioning technology that refines the basic cell identity positioning method in a variety of ways. The present disclosure is based on the information of these two as a starting point.

Figure 9:
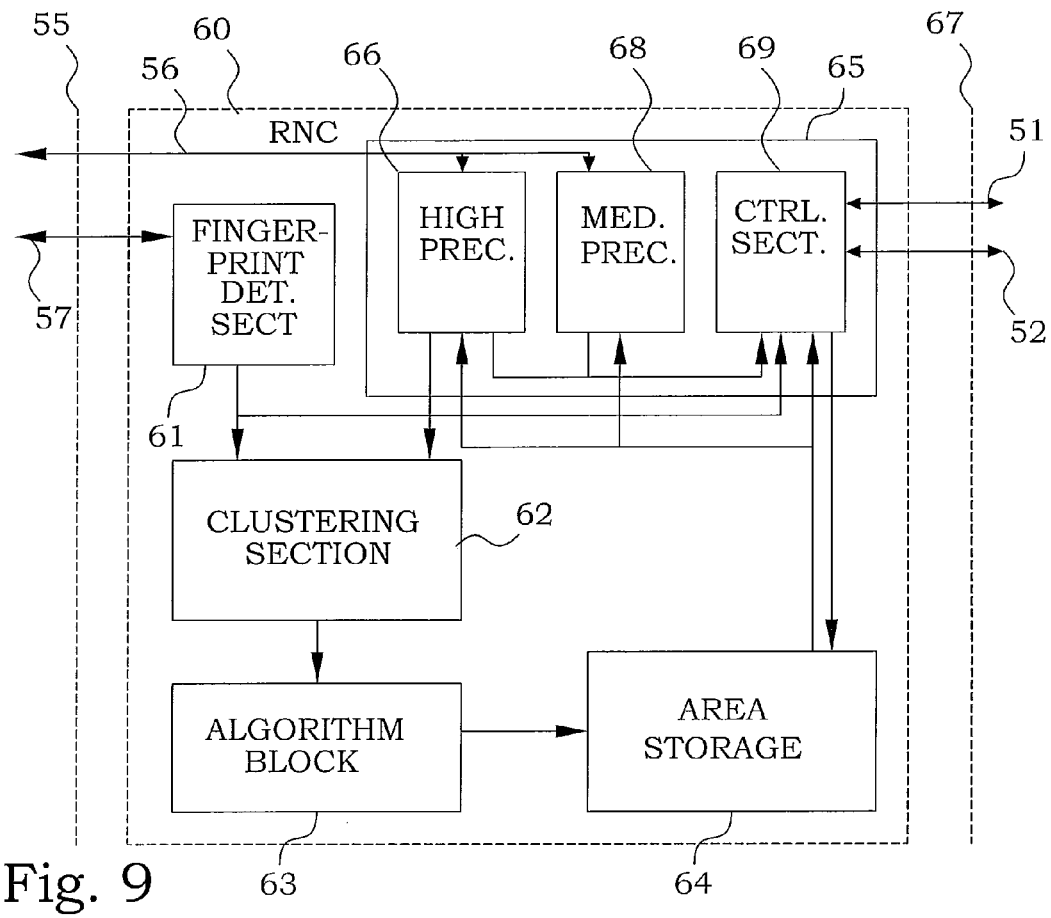
FIG. 9 is a block diagram of an embodiment of a positioning node operating according to AECID.

FIG. 9 is a block diagram of an embodiment of a positioning node 65 based on AECID positioning. In the present embodiment, which is assumed to be comprised in a WCDMA system, such functionality is preferably comprised in the RNC 60. Another possibility is to implement the invention in the SAS node (e.g. an Ericsson SMLC) on the other side of the Iupc interface. Still another possibility is to log measurements and perform the algorithms in OSS-RC or even a completely external node. New interfaces and/or information elements in existing interfaces allowing for exchange of detected cell sets and measured high-precision position determination results may then be necessary. More alternatives are presented further below.

The RNC 60 communicates with UEs, transparently via RBSs, using the RRC interface 55. In the present context, at least two information types are of interest; positioning measurements 56, in particular high-precision positioning measurements, and fingerprint parameter measurements 57. The fingerprint parameter measurements 57 are provided to the fingerprint determining section 61. The determined fingerprint configuration of a particular user equipment is provided to a clustering section 62.

The positioning measurements 56 are provided to the positioning node 65. The high-precision positioning measurements are provided to a high-precision positioning section 66, which e.g. can comprise UTDOA or A-GPS based positioning. Other positioning measurements, e.g. cell ID or RTT positioning measurements are in the present embodiment provided to a medium-precision positioning section 68. The outcome of the analysis of the high-precision positioning measurements, i.e. high-precision positions are provided to the clustering section 62, where the high-precision position is associated with a corresponding fingerprint configuration. The measurements are clustered depending on the fingerprint configuration.

The clusters of positions for a certain fingerprint configuration are provided to an algorithmic block 63. In the algorithmic block 63, area definitions are calculated. An area that describes each cluster of measurements, at a specified confidence level, is computed in the algorithmic block 63. In the WCDMA case, the preferred area definition is a polygon defined by 3 to 15 corner coordinates. In a particular embodiment, the algorithmic block 63 provides polygons such that the probability that a given fraction of high-precision measurements of a cluster are located in the interior of the polygon. This algorithmic block 63 preferably performs repeated re-calculations of polygons, for all measurement clusters with a sufficient number of recent enough high-precision measurements. The area definitions are provided to an area storage 64, where polygons representing a hierarchically organized set of cell relation configurations are stored. The stored polygons are then used by positioning algorithms of the system. The data structure of the stored polygons preferably contains a list of pointers covering each relevant fingerprint configuration. Each such pointer points to a corresponding 3-15 corner polygon, computed repeatedly as described above. The data structure preferably also contains a time tag for each polygon that defines the time when the polygon was computed.

When a position determination according to the principles of the present invention is requested, a fingerprint configuration is determined in the fingerprint determining section 61 as usual. The result is forwarded to a control section 69 in the positioning node 65. When a positioning request 51 is received, e.g. a so-called Location Reporting Control message over the RANAP interface 67, the control section 69 may, based on quality of service parameters and UE capability, request a position determination by retrieving an area definition from the area storage 64, which corresponds to the present fingerprint configuration of the UE. The achieved area definition, preferably a polygon definition is included in a positioning reporting message 52, which typically is sent back over the RANAP interface 67 using e.g. a so-called Location Report message.

If the area definitions are to be used together with any additional positioning method, the retrieved area from the area storage 64 is provided to the high-precision positioning section 66 or the medium-precision positioning section 68, depending on the method to be used. The final determined position is then provided to the control section 69 for further reporting.

The AECID positioning method, schematically illustrated in FIG. 9, is thus based on the idea that high precision positioning measurements, e.g. A-GPS measurements, can be seen as points that belong to regions where certain cellular radio propagation condition persist. In its simplest form A-GPS measurements that are performed at the same time as a certain cell ID is valid represent A-GPS measurements that fall within a specific cell of a cellular system. The AECID positioning method recognizes this and introduces a tagging of high precision measurements according to certain criteria, as described above.

The second step of the AECID positioning method is to collect all high precision positioning measurements that have the same tag in separate high precision measurement clusters, and to perform further processing of said cluster in order to refine it, see e.g. the published international patent application WO 2008/054272. It is clear that each such cluster consists of high precision position measurements collected from a region with similar radio conditions—hence the measurements are normally from the same well defined geographical region. More specifically, that specific geographical region is normally substantially smaller than the extension of a cell of the cellular system.

In a third step of the AECID positioning method, a polygon that represents the geographical extension of a cluster is computed, for each stored high precision position measurement cluster. The details of this algorithm are disclosed in the published international patent applications WO 2007/043915, WO 2008/118052 and WO 2008/069712 and are not repeated here in detail. One pronounced property of the algorithm comprises that the area of the polygon is minimized. In other words, the accuracy is maximized. Furthermore, the algorithm comprises that the probability that the terminal is within the polygon, i.e. the confidence, is precisely known. It is set as a constraint in the algorithm.

So far steps towards the creation of a tagged database of polygons have been described. An AECID position is now easily determined by a first determination of the persisting tag. This is performed by looking up cell ID's, by performing auxiliary measurements and by looking up auxiliary connection information, as described above. The polygon corresponding to the determined tag is then looked up in the tagged database of polygons, followed by a reporting, e.g. over RANAP.

Also this fingerprinting technology is sometimes too inaccurate. This is partly due to the limited availability of good enough measurements. In particular the RTT and TA measurements provide very good accuracy in the radial direction, while the lateral accuracy is poor. Signal strength measurements can, depending on the cell geometries, sometimes provide additional lateral information. The problem is, however, that these measurements are very inaccurate.

There is hence a need for additional information also in AECID. According to an embodiment of the present invention, the effect of a combination of precoder based position information and the prior art fingerprint information provides a significantly enhanced positioning accuracy. This makes a significant difference for MIMO configurations, in WCDMA and particularly in LTE.

The advantages follow since the pre-coding lobe forms are not necessarily regular, as in normal directional antennas. They therefore lend themselves perfectly for integration into a fingerprinting positioning method, like the AECID method described further above. The actual combination can be performed according to different strategies.

In one embodiment, illustrated in FIG. 10D, the fingerprinting routine can be performed by using tags of other information than precoder indices, e.g. timing information. When the actual positioning is to be performed, the present timing information and/or other information is used as input for finding an area in which the UE is present. The precoder index can then be used to further reduce this area in a position refiner unit due to the limitation in angles connected to the precoder index.

An embodiment of a method according to these ideas is described by the already discussed FIG. 8. Step 216 comprises in this embodiment a basic position determining that is a fingerprinting positioning method giving an area typically defined by a polygon. In step 218 this area is then limited by the angular intervals defined by the precoder selection data.

In other embodiments, the precoder index may instead be entered into the algorithms as a tagging criterion. The tag could in one embodiment depend only on the precoder index. This approach is schematically illustrated in FIG. 10A. High-accuracy positioning information is entered together with precoder index into the fingerprinting scheme for creation of associated areas. The fingerprinting method then creates areas which are connected to each precoder index. When a position is to be determined, there is a connection with a certain precoder index and an area in which the UE using the precoder index is situated, with a certain certainty.

A refinement of this positioning can then in a further embodiment be achieved by combining this area information with additionally available positioning information, e.g. some timing information. This is illustrated in FIG. 10B, where additionally available position related information is provided to a position refiner unit. A further reduction of the probable area of a possible position can then be achieved in many cases. In such a case, the fingerprinting position area as obtained by the AECID approach can be combined e.g. with RTT or TA positioning determinations, and the enhanced positioning will then be the overlapping areas of these two different approaches.

In yet another embodiment, timing information, i.e. distance information, or other types of position related information, is used together with the precoder index to form the tags of the fingerprinting routines. This is illustrated in FIG. 10C. When performing an actual positioning, both the timing information, or other information, and the precoder index is needed to select the appropriate area of the UE. This is presently the embodiment that is believed to have the best performance with respect to the available information. In such an embodiment, the fingerprinting database comprises data obtained by use of prior-art parameters as well as of precoder index information.

As mentioned further above, the selection of a precoder index is based on an implicit angle measurement made by the UE. This measurement is made as part of precoder selection for Spatial Multiplexing and known as such. The angle measurements, or data representing it, are reported to the base station, where the actual selection for spatial multiplexing is made. Corresponding information is returned to the user equipment for enabling a correct reception of signals. This is all known in prior art as such.

Figure 11A:
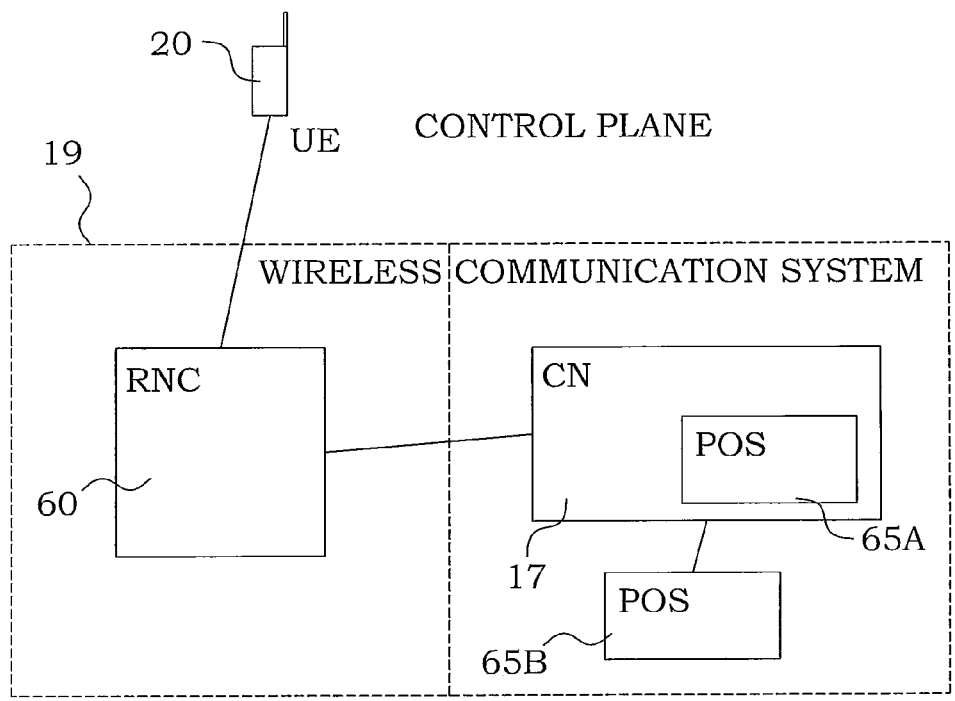
FIGS. 11A-D are schematic configurations of cellular networks and positioning nodes according to different embodiments of the present invention.

However, it is not previously known to report this information for use as position related information. With references to FIGS. 11A-D, the measurements of the quality for the different precoder indices or any information associated with these measurements, e.g. the final precoder selection, are therefore provided from the UE 20 to a positioning node 65A-C having positioning capabilities, i.e. having a position determining unit. Such a provision can be performed according to different schemes. The most traditional manner is to use the control plane of the wireless communication system 19 and send the information to the radio network controller RNC 60 in WCDMA or corresponding eNodeB 11 for LTE. The radio network controller RNC 60 then forwards this information to a positioning node 65A in the core network 17 of the wireless communication system 19 or a positioning node 65B connected to the core network 17. Such a configuration is illustrated in FIG. 11A for e.g. WCDMA and in FIG. 11C for LTE.

Figure 11B:
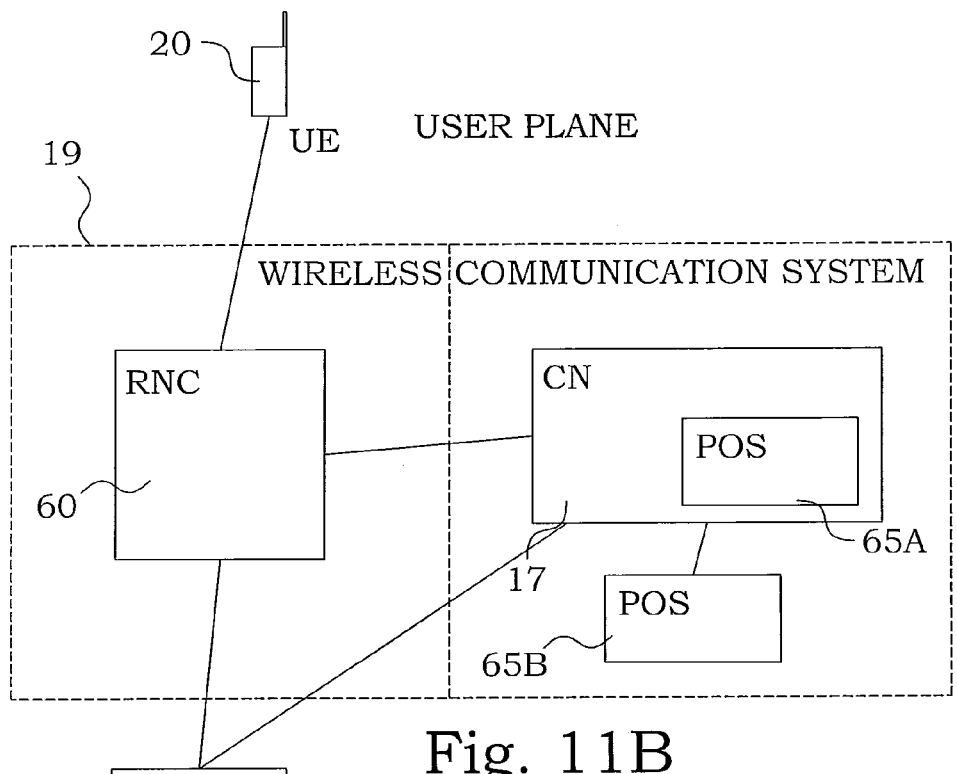
Figure 11C:
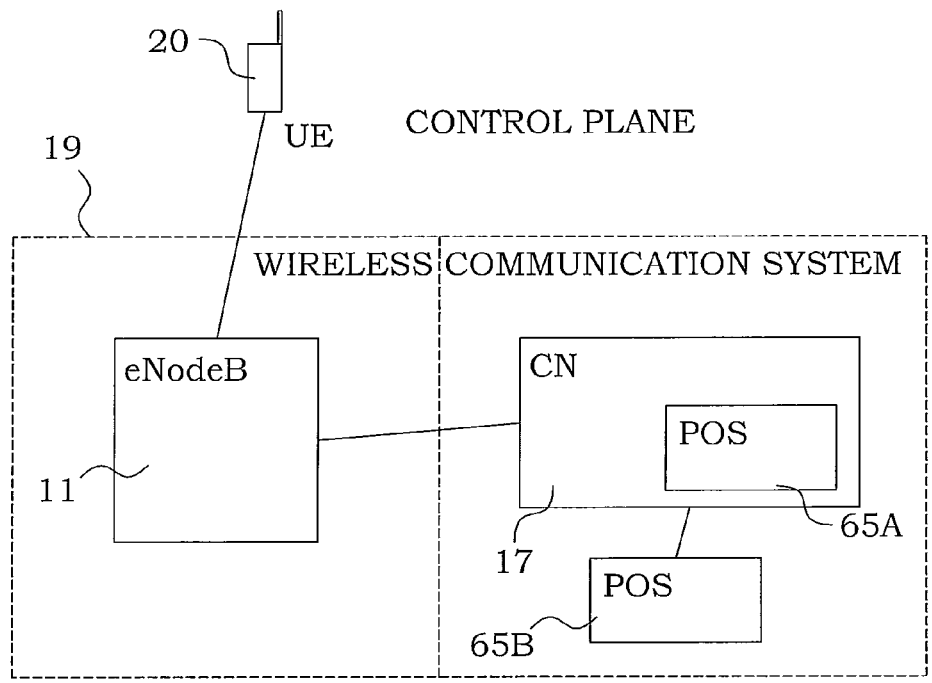
Figure 11D:
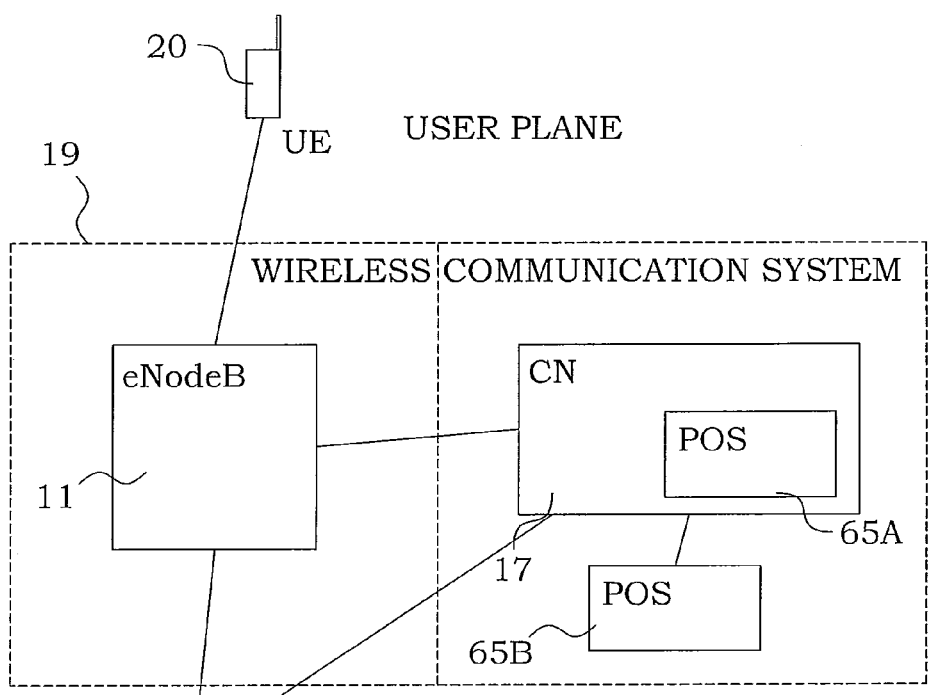

In another alternative embodiment, the user plane can be used for providing the information associated with the measurements for precoder selection. The information may thereby be directed to a positioning node 65A in the core network 17, a positioning node 65B connected to the core network 17 or to an external positioning node 65C. This is schematically illustrated in FIG. 11B for WCDMA and FIG. 11D for LTE. This approach follows basically the general concept of transmitting position-related information based on standardized interfaces, e.g. Java Micro edition, Symbian, Linux and Windows for Mobile, for applications in the user equipment. Such interfaces make it possible to access position related data and the results of basic measurement information that is available in the user terminal. The interface is exploited in order to report available position related information to a server. The server can be owned and operated by the cellular communication system operator or an external service provider.

The operation of such information distribution can be based on a generation of a message internally in the user equipment. In an embodiment of a method for collecting and distributing position related information, the method includes initiating, by generating a message within the user equipment, collection of the positioning data. The positioning data comprises precoder selection data or measurements for enabling such selection. The positioning data may also comprise other positioning information intended for a basic positioning method. The method further comprises measuring, by the user equipment, at least one parameter related to the precoder selection of the user equipment in response to the message. The method further comprises producing, within the user equipment, measurement reports that include the mentioned at least one parameter and reporting the selected one or more measurement reports to an interface within the user equipment. The measurements report or precoder selection based on such measurement report is transmitted from the interface to an external server or to the communication network.

The user equipment is thus configured to collect positioning data. The user equipment therefore includes a processor configured to initiate, by generating a message, collection of the positioning data. The processor is further configured to instruct a measuring unit to measure at least one parameter related to the precoder selection of the user equipment in response to the message. The processor is further configured to generate measurement reports that include the parameter and report the selected one or more measurement reports to an interface within the user equipment. The user equipment also includes a transceiver connected to the processor and configured to transmit the reported one or more measurement reports or a precoder selection based thereon to an external server or to the communication network.

Figure 12:
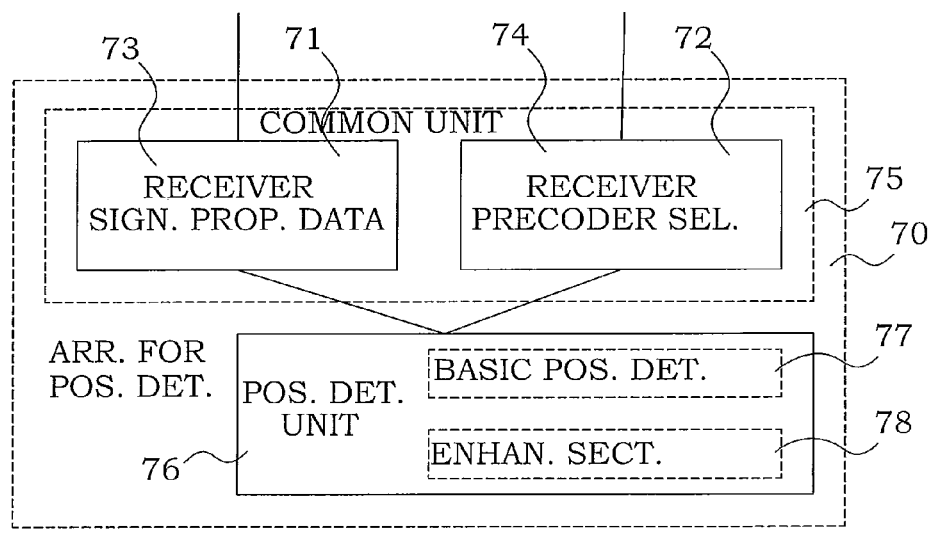
FIG. 12 is a block diagram of an arrangement for providing a position determination.

One embodiment of an arrangement 70 for providing a position determination is illustrated in FIG. 12. This arrangement 70 is typically comprised in a positioning node according to the discussions above, but may also be distributed between more than one node. The arrangement 70 comprises means 71 for obtaining data representing signal properties of a cellular communication network associated with a user equipment. The means 71 for obtaining data representing signal properties is typically a receiver 73 of data over a user plane of the cellular communication network or a receiver 73 of data over a control plane of the cellular communication network. In the latter case, the arrangement 70 is a part of the cellular communication network. The arrangement 70 comprises a position determining unit 76. The position determining unit 76 is connected to the means 71 for obtaining data representing signal properties for receiving information therefrom. The position determining unit 76 is arranged for determining of a position for the user equipment based on the obtained signal properties.

The arrangement 70 further comprises means 73 for obtaining data representing a precoder selection for spatial multiplexing for the user equipment. The means 73 for obtaining data representing a precoder selection for spatial multiplexing for the user equipment is typically a receiver 74 of data over a user plane of the cellular communication network or a receiver 74 of data over a control plane of the cellular communication network. Typically, this means 73 for obtaining data representing a precoder selection is coordinated or integrated with the means 71 for obtaining data representing signal properties in a common unit 75. The position determining unit 76 is connected also to the means 73 for obtaining data representing a precoder selection. The position determining unit 76 is further arranged for partly basing the determining of a position on the obtained precoder selection.

In one particular embodiment, the position determining unit 76 in turn comprises a basic position determining section 77 operating on the signal properties and an enhancement section 78 operating by use of the precoder selection data. As one example, the basic positioning determining section 77 is arranged for determining a position based on timing advance measurements or round trip time measurements. As another example, the basic positioning determining section 77 is arranged for determining a position based on adaptive enhanced cell identity positioning.

In another particular embodiment, the position determining unit 76 is arranged for determining a position based on adaptive enhanced cell identity positioning with the data representing a precoder selection as input. The adaptive enhanced cell identity positioning can as described further above also be performed based on other position related data forming the fingerprint.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

AECID—Adaptive Enhanced Cell-ID
A-GPS—Assisted Global Positioning System
CDMA—Code Division Multiple Access
GPS—Global Positioning System
IRC—Interference Rejection Combining
LTE—Long-Term Evolution
MIMO—Multiple-Input Multiple-Output
MMSE—Minimum Mean Square Error OFDM—Orthogonal Frequency-Division Multiplexing
OSS-RC—Operation and Support System—Radio and Core
OTDOA—Observed Time Difference Of Arrival
QAM—Quadrature Amplitude Modulation
QPSK—Quadrature Phase-Shift Keying
RAB—Radio Access Bearer
RAN—Radio Access Network
RANAP—Radio Access Network Application Part
RBS—Radio Base Station
RNC—Radio Network Controller
RTT—Round Trip Time
SMLC—Service Mobile Location Centre
SNR—Signal-to-Noise Ratio
TA—Timing Advance
TX—Transmitter
UE—User Equipment
WCDMA—Wideband Code Division Multiple Access
WiMAX—Worldwide Interoperability for Microwave Access

The invention claimed is:

1. A method of determining a position of a user equipment, comprising:
    obtaining data representing signal properties of a cellular communication network, the signal properties being associated with said user equipment;
    obtaining data representing a precoder selection for spatial multiplexing, said precoder selection also being associated with said user equipment; and
    determining a position for said user equipment based on said data representing said signal properties and said data representing said precoder selection.

2. The method according to claim 1, wherein said determining comprises:
    determining a basic position for said user equipment based on said data representing said signal properties; and
    determining an enhancement of said basic position using said data representing said precoder selection.

3. The method according to claim 2, wherein determining said basic position is based on timing advance measurements or round trip time measurements.

4. The method according to claim 2, wherein determining said basic position is based on adaptive enhanced cell identity positioning.

5. The method according to claim 1, wherein said determining is based on adaptive enhanced cell identity positioning with said data representing said precoder selection as input.

6. The method according to claim 1, wherein at least one of said obtaining data representing signal properties and said obtaining data representing a precoder selection comprises receiving data over a control plane of said cellular communication network.

7. The method according to claim 1, wherein at least one of said obtaining data representing signal properties and said obtaining data representing a precoder selection comprises receiving data over a user plane of said cellular communication network.

8. An arrangement for determining a position for a user equipment, comprising:
    a receiver configured to obtain data representing signal properties of a cellular communication network and data representing a precoder selection for spatial multiplexing, both said data representing said signal properties and said data representing said precoder selection being associated with said user equipment; and
    a position determining unit connected to said receiver and configured to determine a position for said user equipment based on said data representing said signal properties and said data representing said precoder selection.

9. The arrangement according to claim 8, wherein said position determining unit comprises a basic position determining section configured to determine a basic position for said user equipment based on said data representing said signal properties and an enhancement section configured to determine an enhancement of said basic position using said data representing said precoder selection.

10. The arrangement according to claim 9, wherein said basic positioning determining section is configured to determine said basic position based on timing advance measurements or round trip time measurements.

11. The arrangement according to claim 9, wherein said basic positioning determining section is configured to determine said basic position based on adaptive enhanced cell identity positioning.

12. The arrangement according to claim 8, wherein said position determining unit is configured to determine said position based on adaptive enhanced cell identity positioning with said data representing a precoder selection as input.

13. The arrangement according to claim 8, wherein said receiver is configured to receive said data representing said signal properties and said data representing said precoder selection over a control plane of said cellular communication network.

14. The arrangement according to claim 8, wherein said receiver is configured to receive said data representing said signal properties and said data representing said precoder selection over a user plane of said cellular communication network.

15. The arrangement according to claim 8, wherein said arrangement is provided in nodes of said cellular communication network.

16. The arrangement according to claim 8, wherein said arrangement is provided in an external node with respect to said cellular communication network.

* * * * *

UNITED STATES PATENT AND TRADEMARK OFFICE
CERTIFICATE OF CORRECTION

PATENT NO.       : 8,406,787 B2
APPLICATION NO.  : 13/140234
DATED            : March 26, 2013
INVENTOR(S)      : Kangas et al.

It is certified that error appears in the above-identified patent and that said Letters Patent is hereby corrected as shown below:

On the Title Page, in Item (75), under "Inventors", in Column 1, Line 1,
delete "Lidiingö" and insert -- Lidingö --, therefor.

In the Specification

In Column 5, Line 14, delete " $x(k,l) = W_{RI,PMI}(k,l) \cdot s(k,l) \quad ()$ " and insert -- $x(k,l) = W_{RI,PMI}(k,l) \cdot s(k,l), \quad (1)$ --, therefor.

In Column 6, Lines 53-54, in Equation (8),
delete " $\cdot \exp(-2\pi \Delta_{k,l} \sin(\theta)/\lambda) \cdot s$ " and
insert -- $\cdot \exp(-i2\pi \Delta_{k,l} \sin(\theta)/\lambda) \cdot s$ --, therefor.

In Column 6, Line 67, delete "49E-1 of 5" and insert -- 49E-I of 5 --, therefor.

Signed and Sealed this
Fourth Day of February, 2014

Michelle K. Lee
*Deputy Director of the United States Patent and Trademark Office*